SEMICONDUCTOR SIGNAL STORAGE DEVICE

Filed April 20, 1956

2 Sheets-Sheet 1

INVENTOR
I. M. ROSS
BY [signature]
ATTORNEY

INVENTOR
I. M. ROSS
BY Johnson D. Fell
ATTORNEY

United States Patent Office 2,877,359

Patented Mar. 10, 1959

2,877,359

SEMICONDUCTOR SIGNAL STORAGE DEVICE

Ian M. Ross, New Providence, N. J., assignor to Bell Telephone Laboratories, Incorporated, New York, N. Y., a corporation of New York Application April 20, 1956, Serial No. 579,591

6 Claims. (Cl. 307—88.5)

This invention relates to switches and switching arrangements for electrical signals with particular emphasis on methods of and apparatus for storing information.

Objects of this invention are to facilitate the switching of electrical signals, to improve semiconductive translators, to adapt semiconductive translators to improved switching functions, and to reduce the energy required to effect a switching operation.

Another object of this invention is to simplify storage or memory devices and techniques. Additional objects of this invention are to attain control of storage and read-out of information with small power expenditure, to store information over any desired interval, and, in particular, to facilitate storage and read-out of signals in semiconductor translating devices.

These objects are realized in one illustrative embodiment of this invention by applying to a bistable translating element having a low and a high impedance state, a pulsing means offering a pulse magnitude sufficient to maintain the element in either state, and a pulse-off interval which is short compared to the normal time required to switch the element from its low to its high impedance state. Means are also provided for selectively placing the device in either of its states to represent an information bit and maintain it in that state as long as desired and so long as the pulsing means operates.

One means of switching the unit or of establishing an information representing state in the unit is to inject charge carriers into a region between an emitter and a collector of such carriers to switch it to its low impedance state and to apply a pulse train as described above to regenerate that state until such time as it is appropriate to return to the high impedance state. Information can be read out by monitoring the current or voltage at a convenient point in the memory circuit.

Switching from the low to the high impedance state is effected by withdrawing charge carriers from the region between the emitter and collector, in one instance, at a faster rate than that at which those carriers normally disappear from that region while the pulse train is at a no-pulse interval. This withdrawal reduces the carrier density in the region below that at which regeneration can occur when the pulse exceeding the sustaining level is again applied.

One form of translating element which can be employed in a combination of this form to effect a memory function is a semiconductive translator basically paralleling that switching element disclosed by W. Shockley in his application Serial No. 548,330 which was filed November 22, 1955, modified to provide means for reading information into or out of the unit.

In accordance with one feature of this invention a translating element having two stable impedance states and an intrinsic turn-off time from one state to the other is employed to regenerate a signal over any desired interval whereby this regenerated signal can be read out of the element as a stored information bit or will maintain the unit as a closed switch. Signal regeneration is effected by applying a biasing signal as a train of pulses which is capable of maintaining the element in either of its states. The off time in the pulse train is chosen as less than the intrinsic turn-off time of the element and greater than a controllable accelerated turn-off time so that upon actuation of the turn-off control the element is reset.

Another feature resides in triggering a two state device from its high to its low impedance state by the injection of charge carriers into a region of the device intermediate a source and a collector of said carriers. Triggering may be effected by the application of energy to only a localized portion of the device.

A subsidiary of the above feature, as applied to semiconductive units embodying two or more rectifying barrier regions, resides in effecting an increase of charge carrier injection sufficient for triggering by applying an increased forward bias across one of said barriers.

An additional feature involves accelerating the turn-off time of a two state element as discussed above by withdrawing charge carriers from a region of the device intermediate a source and a collector in response to a control signal. This feature, as applied to a semiconductor element, involves actuating a supplemental charge carrier collector to withdraw carriers from the region between the emitter and main collector as by reverse biasing the normally forward biased emitter rectifying barrier.

A further feature of the invention is the provision of a third connection to one of the intermediate zones of a four zone semiconductive element having a diode characteristic including two stable impedance states as discussed above whereby the state of the impedance of that diode characteristic can be controlled more conveniently, faster, and with an expenditure of less energy than heretofore.

The above and other objects and features of this invention will be more fully understood from the following detailed description when read in conjunction with the accompanying drawing, in which.

Figure 1:
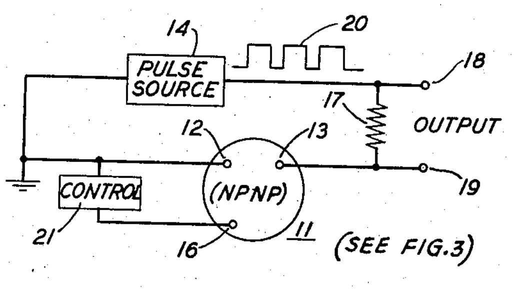
Fig. 1 is a schematic representation of a memory device or cell in accordance with this invention.

A general form of the memory device of this invention is shown in Fig. 1 wherein a signal translator 11, which has a high and a low impedance state as viewed across terminals 12 and 13 and an intrinsic turn-off time from its low to its high impedance state, cooperates with a pulse generator 14 connected across terminals 12 and 13 to maintain either of its two impedance states. Pulse generator 14 may be of a type known to the art which produces a pulse train offering the characteristics required for the operation of the switch or memory cell as set forth below, for example, a square wave generator producing a pulse train of the form shown generally at 20. At least one additional control terminal 16 is provided for translator 11 to enable the device to be placed in the desired impedance state. An information bit is read into the translator 11 by means of an appropriate signal applied by control circuit 21 to terminal 16 and can be read out of the device as a voltage across load resistance 17 at output terminals 18 and 19.

Figure 2:
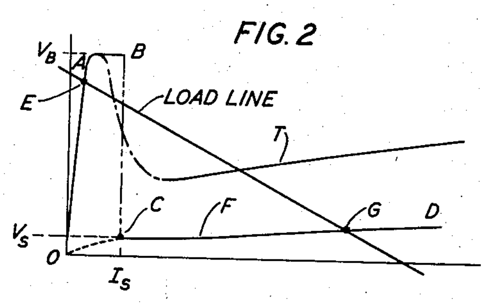
Fig. 2 is a plot of voltage against current for typical translating elements suitable for application in a device as shown in Fig. 1.

The current voltage characteristics of typical translators suitable for this memory device are shown in Fig. 2. A number of devices which are known to have these forms of characteristics can be employed in the memory device. For example, curve T is typical of devices of the type disclosed in application Serial No. 521,765, filed July 13, 1955, of J. J. Ebers and S. L. Miller and in application Serial No. 521,757, filed July 13, 1955, of I. M. Ross, wherein a semiconductive body having two rectifying barrier regions shifts from a high impedance to a low impedance state by a change in alpha as a function of current due to a change in the total effective area of the barrier from which minority charge carriers are emitted and/or by a shift as a function of current in the location of the effective area from which charge carriers are emitted. The adaptation of devices of this nature to the present invention will be discussed below. Curve F shows the characteristic of a particular form of two terminal device to be discussed in detail. This device as a two terminal element is disclosed in the above-mentioned application of W. Shockley.

Figure 3:
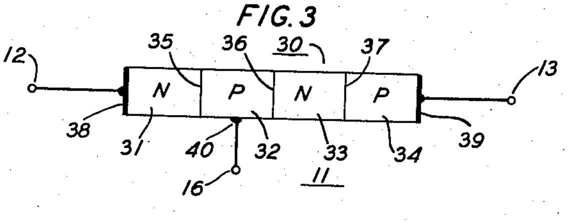
Fig. 3 shows one form of semiconductive translating element suitable for incorporation in the device of Fig. 1.

The configuration of the semiconductive translating unit disclosed by Shockley, as modified according to this invention, is shown in Fig. 3. It includes a body of semiconductive material 30, for example, germanium, silicon, or silicon-germanium alloys, having therein four contiguous consecutively arranged zones 31, 32, 33, and 34, each pair of adjacent zones being of opposite conductivity types, the illustrated embodiment comprising an n-p-n-p array of zones. Thus, the body includes three spaced rectifying barriers 35, 36, and 37 in the form of p-n junctions. Low resistance nonrectifying connections 38 and 39 are made to the outer zones 31 and 34 to provide device terminals 12 and 13.

When a voltage is applied to the terminals 12 and 13 so that the outer barriers 35 and 37 are forward biased and the inner barrier 36 is reverse biased, terminal 12 is poled negative with respect to terminal 13, the unit exhibits either a low impedance or a high impedance stable state as viewed across the terminals as disclosed in Fig. 2. For voltages and currents below a certain value impressed across the terminals 12 and 13, the breakdown voltage $V_B$ and the sustaining current $I_S$ as shown in Fig. 2, the high impedance state prevails and the unit operates along curve OA, passing a current which is approximately the reverse saturation current of junction 36. The impedance of the unit is a function of the average density of minority charge carriers in one or both of zones 32 and 33. When that critical or breakdown voltage $V_B$ is applied, the current increases to at least the sustaining level and the density of minority charge carriers increases in zones 32 and 33. The device then enters a negative resistance region of operation BC and passes into the low impedance state CD. A voltage in excess of a certain value and materially less than the breakdown voltage applied across terminals 12 and 13, the sustaining voltage $V_S$, will maintain the minority charge carrier density at the level required to hold the unit in its low impedance state. The unit is returned to its high impedance state by reducing the minority charge carrier density in the region between junctions 35 and 37 as by reducing the voltage below the sustaining level. A load line for a source-load combination connected across terminals 12 and 13, as shown, will thus establish two stable operating points, one of high impedance at E and one of low impedance at G.

Shockley has pointed out that this mode of operation, a high impedance with low currents and a low impedance with high currents, can be explained on the basis of a shift in the effective current multiplication of the unit from less than unity to essentially unity with an increase in current above some critical level. The mechanism proposed to explain this shift in current multiplication involves considering the multiplication in the device as made up of the sum of the current multiplications which are effective across each of the inner pair of zones 32 and 33 from its forward biased minority carrier emitting junctions 35 and 37 to the reverse biased collecting junction 36 common to each.

The current through body 30 is approximately given by $$\frac{I_{CO}}{1-(\alpha_1+\alpha_2)}$$

where $I_{CO}$ is the reverse saturation current of the junction 36 when junctions 35 and 37 are short circuited by connections which inject no minority charge carriers into zones 32 and 33, and $\alpha_1$ and $\alpha_2$ are the inherent alphas of the intermediate zones 32 and 33, respectively. The inherent alpha of each zone is the ratio of the current change across the collecting junction of the zone to the current change across the emitting junction of the zone when the potential across the collecting junction is held constant. The body 30 is prepared so that at least one of the intermediate zones has an inherent alpha which increases with increasing carrier density in that zone. Advantageously, this is achieved by having at least one zone in which the lifetime increases with increasing carrier density. It is also important that the inherent alphas of the two intermediate zones be low at low carrier densities. When the carrier densities are low as when the current is limited to approximately the reverse saturation current of junction 36, the inherent alphas of the two intermediate zones and their sum, the effective alpha of the body, are small. As a consequence, only a small current will flow through the body 30 and it acts as a high impedance.

When the density of minority charge carriers is raised in one or both of zones 32 and 33 by some appropriate means the inherent alpha of one or both of those zones increases thereby increasing the effective alpha of the body to decrease the denominator in the above equation and thereby increase the current through the body.

Without intending that the explanation of the theory of operation be limiting, it is believed that the current dependence of the mutiplication of one or both of the individual zones is attributed to a change in lifetime of charge carriers injected into that zone as the current magnitude changes. Charge carriers injected into a zone containing high density of effective charge carrier recombination centers have less likelihood of traversing the zone to a collector junction than when injected into a zone containing only a few effective recombination centers since fewer carriers are drawn into those centers. The probability of a successful passage across the region, and thus the lifetime of a minority carrier, is an inverse function of the density of effective recombination centers. When the centers range from about $10^{14}$ to $10^{15}$ per cubic centimeter of material, they readily can be deactivated by saturating them with charge carriers. When the number of injected minority charge carriers is sufficient to effect this saturation, essentially all of the charge carriers injected above this quantity necessary to maintain saturation of the centers will diffuse and/or drift to the collector junction and contribute to conduction through the device. Thus, the lifetime of the injected carriers is high when the centers are saturated, as occurs above a critical current level. Upon removal of a carrier injecting force, as by reducing the voltage across terminals 12 and 13 below the sustaining value, the carriers persist for some discrete interval, some continuing to flow to the collector junction and other entering the recombination centers. After this interval, the intrinsic turn-off time, the level of unfilled recombination centers raises to a point where the reapplication of a voltage across terminals 12 and 13 of a magnitude less than the breakdown voltage, yet exceeding the sustaining voltage, is insufficient to inject enough carriers to saturate the centers and the device exhibits its high impedance state.

When a unit 11 offering these or equivalent characteristics has a signal applied across its terminals of a maximum magnitude less than the critical level $V_B$ and greater than the sustaining level $V_S$ and this signal is periodically removed for an interval which is shorter than the intrinsic turn-off time, the unit will remain in whichever impedance state it is placed thereby providing a memory function. It is to be noted that this bistable operation is attained with the potential of zones 32 and 33 floating.

Consider the translator of Fig. 3 with a voltage of a magnitude greater than $V_S$ and less than $V_B$ applied across terminals 12 and 13. When that voltage is applied initially, the translator operates in the high impedance region OA of Fig. 2. If the translator is placed in its low impedance condition, however, the applied voltage causes it to operate in the low impedance region CD of Fig. 2. Further, since the charge carrier density in regions 32 and 33 does not decay to zero immediately upon the removal of the voltage from terminals 12 and 13, the voltage at these terminals can be periodically interrupted without changing the state of the device if it is reapplied before the carrier density falls below the level required to maintain the alphas of these regions high or the recombination centers saturated.

Figures 4, 5, 6:
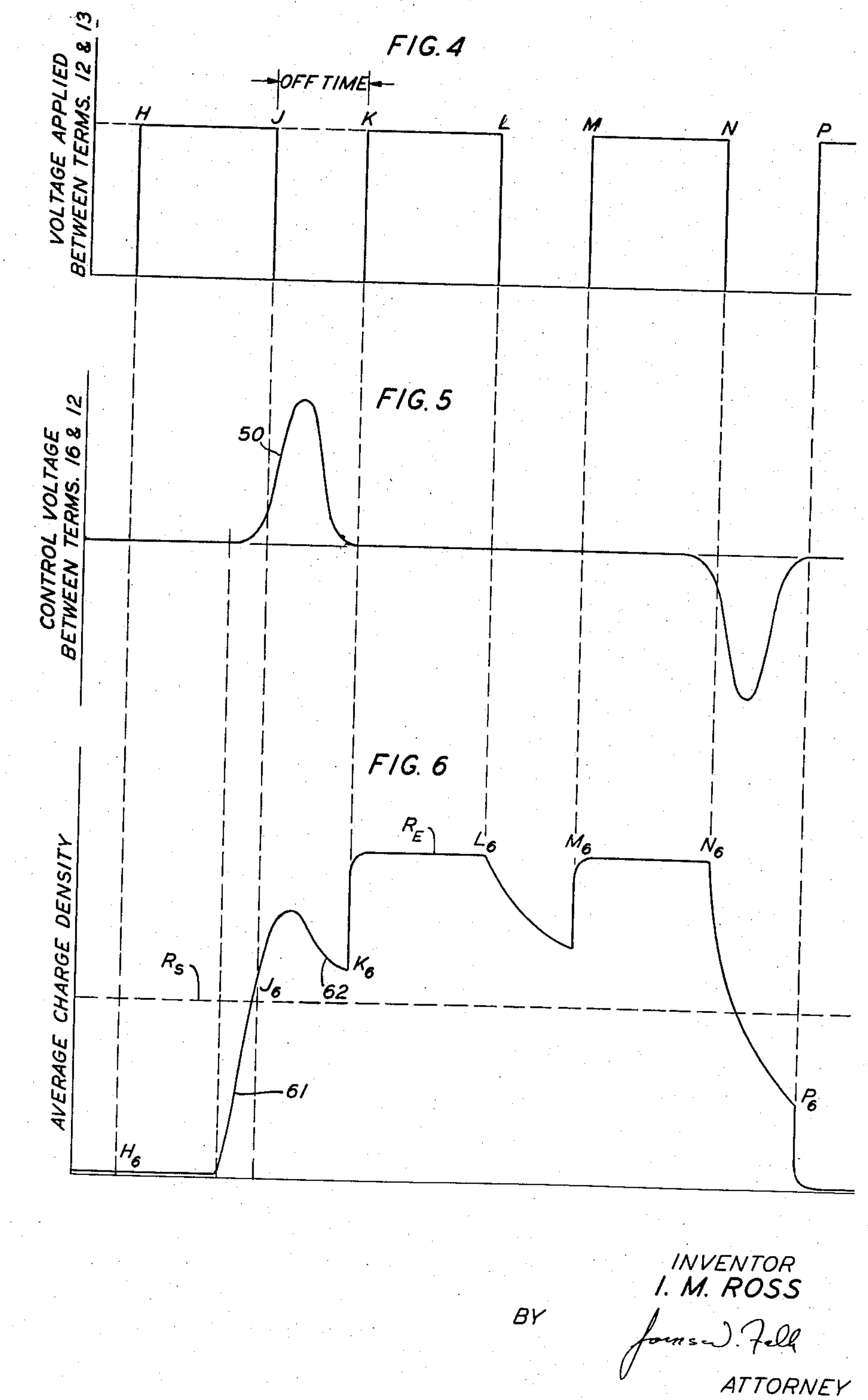
Fig. 4 shows a voltage versus time plot of a typical pulse train as applied across the main terminals of the translator of Figs. 1 and 3.
Fig. 5 is a curve of control voltage versus time employing the time coordinates of Fig. 4.
Fig. 6 is a curve of average charge carrier density in the region between the charge carrier source and collector which is subject to the control voltage of Fig. 5 as a function of the time coordinates of Fig. 4.

The effect of a pulse train derived from a source 14 and applied to terminals 12 and 13 of the translator of Fig. 3 will be appreciated from a consideration of Figs. 4, 5, and 6. The voltage versus time plot of Fig. 4 represents the train applied to terminals 12 and 13. In the discussion which follows, the control functions will be considered to be effective in but one zone or region adjacent collector 36, namely 32, although it is to be understood that these functions can be realized in either or both zones. Since the potentials at zone 32 and barrier 35 are the control in the illustrative embodiment, it is desirable to stabilize those potentials; this is accomplished by grounding the main terminal 12 closest to the controlled region, thereby fixing the floating potential of zone 32. This train can be applied continuously or only in response to a suitable initiating signal, such as the application of a switching impulse or a signal which is to be remembered. The magnitude of the pulse exceeds the sustaining voltage and is less than the breakdown voltage of translator 11. Its off time, JK, the interval from the time the trailing portion of a pulse falls below $V_S$ to the time the leading portion of the next succeeding pulse exceeds $V_S$, should be shorter than the intrinsic turn-off time of the translator. As will be discussed, the translator when employed in a memory device or switch having a continuous bias supplied by a pulse train requires a means to accelerate its turn-off time. The pulse-off time, JK, should be longer than the accelerated turn-off time of the translator. The pulse-on time, KL, the interval over which the applied voltage exceeds the sustaining voltage, should be long enough to permit the minority carrier density resulting from the injection of minority carriers from the forward biased junction to attain a level sufficient to maintain the recombination centers saturated during the following pulse-off interval. This level can conveniently be the equilibrium density for the voltage applied. Considered from another point of view, the pulse-on interval should be longer than the transit time of a charge carrier from emitting barrier 35 to collecting barrier 36 across region 32 while the pulse-off interval should be shorter than the transit time across region 32. The relative lengths of the pulse and pulse-off intervals in Figs. 4, 5, and 6 are not to be interpreted as setting forth the form of the pulse train. In particular, the pulse-off interval has been expanded along the time axis for purposes of illustration; for example, in practice the pulse length may be fifty times the pulse-off interval.

A semiconductive body 30 having an *n—p—n—p* configuration and terminals 12 and 13 connected to its end zones, if subjected to the signal shown in Fig. 4, would remain in a high impedance state. The average charge density throughout region 32 is shown in Fig. 6 during the initial portion of the interval $H_6J_6$ for this state. This density is extremely low since only a few carriers enter region 32 by leakage from region 33 across the reverse biased junction 36, essentially all of the voltage being applied across junction 36 and essentially no forward bias existing across junction 35. Most of those carriers enter the recombination centers in region 32 to further reduce the density. If the density of minority carriers in region 32, electrons in a region of *p* conductivity type, is increased above the threshold level $R_S$ which saturates the recombination centers in the region when a voltage exceeding the sustaining level is applied as shown in Fig. 6 at $K_6$, the charge carrier density further increases to its equilibrium value $R_E$. The momentary removal of the voltage across terminals 12 and 13 as over the interval LM results in a decline in the average charge density in region 32 as depicted between $L_6$ and $M_6$. This decline follows an exponential form at a rate correlated with the pulse-off interval in a manner such that the voltage is reapplied before the density falls to $R_S$. Thus, the density is regenerated to $R_E$ with the reapplication of the voltage across terminals 12 and 13 and the unit is maintained in its low impedance state. As viewed on Fig. 2 the translator characteristic operates along portions of the solid line CD and its dotted continuation OC.

One means for introducing an average charge density in excess of $R_S$ into region 32 is shown in Fig. 3. It comprises a contact 40 to the region 32 having a terminal 16 to which a source 21 of control signals can be connected as shown in Fig. 1. These control signals momentarily shift the potential of zone 32 from its floating value thereby altering the voltage applied across barrier 35 by connecting the other side of control means 21 to terminal 12. Thus, a voltage pulse from control means 21 poled to impose a forward bias across barrier 35, terminal 16 positive with respect to terminal 12, as shown at 50 in Fig. 5, causes the barrier to emit electrons into region 32. These electrons increase the average charge density as shown between $H_6$ and $K_6$ of Fig. 6 to raise that density above the recombination center saturation level and switch the translator to its low impedance state. It is to be noted that the moment at which the control signal is applied is not critical in accomplishing the switching, provided the average charge density in region 32 exceeds $R_S$ when a voltage exceeding the sustaining level is applied across terminals 12 and 13. The leading edge 61 of the curve representing average charge density corresponds in shape to the leading edge of the signal voltage of Fig. 5 while the trailing edge 62 of that curve follows an exponential decay. In the illustration the control signal 50 was applied before the pulse-off interval JK and has a generally peaked form, which decayed before the pulse-on interval KL; this pulse shape is not critical. Charge density increased as a function of the control pulse but decayed at a much slower rate. When the peak density generated by the signal voltage is as shown in Fig. 6, even if the peak were to occur at the beginning of the pulse-off interval, its decay over that interval would be insufficient to reduce the density below $R_S$ and the next pulse would regenerate it to $R_E$. Further, peaking at an earlier or later instant would offer a higher density at the time the next pulse was applied. Earlier peaking would occur during a portion of a pulse-on interval and thus be aided by the forward bias on barrier 35 resulting from the application of the pulse across terminals 12 and 13, whereby a greater number of electrons would be emitted from that barrier into region 32. Later peaking would offer a shorter interval for carrier density decay and thus the density would be higher when the pulse was applied.

It is to be understood that other means can be employed to increase the average carrier density in region 32. For example, charge carriers can be excited by irradiation of barrier 36 or region 32 with light or those portions can be heated to generate electron-hole pairs. In either instance the density of electrons can be increased sufficiently to exceed the saturation level $R_S$ and the train of pulses of a magnitude exceeding the sustaining level will then generate a density as shown in the interval $K_6$ to $N_6$ of Fig. 6.

The control means 21, in combination with connection 40, also functions as a reset mechanism enabling the translator to be returned to its high impedance state while the pulse train of Fig. 4 is continuously applied to terminals 12 and 13. This reset operation requires the reduction of the average charge density in region 32 below the level required to saturate the recombination centers therein. A reduction of this magnitude is realized by applying a reverse bias across barrier 35 whereby it functions as a collector of electrons from region 32. The magnitude of this reverse bias can either exceed the forward bias on the barrier 35 while the pulses are applied to terminals 12 and 13, or advantageously can be considerably less than that forward bias if applied during the pulse-off interval NP, as shown in Figs. 4, 5, and 6. Again the wave form of the reset signal is not critical, the peaked form shown being for purposes of illustration.

A field in the vicinity of the reverse biased barrier 35 causes those carriers immediately adjacent the barrier to rapidly drift out of region 32. This depletes the carrier concentration in that portion of the region and the carriers tend to redistribute themselves by diffusion causing more to enter the drift field. These mechanisms accelerate the decay of the average charge density level as shown in the interval $N_6P_6$ of Fig. 6 so that that density falls below the saturation level necessary for regeneration of the low impedance state when the voltage exceeding the sustaining level is reapplied. Instead, this voltage imposes a reverse bias on junction 36 which is in a high impedance state due to the absence of sufficient minority carriers to initiate the current multiplication process. This reverse bias further reduces the charge carrier density by sweeping the remaining electrons out of region 32 and the translator is returned to its high impedance condition on the curve OA of Fig. 2.

From the above description it is seen that the translator can be selectively made to operate along one of two voltage-current curves while a fixed pulse train is applied across its main terminals by the expenditure of a small quantity of control energy across a portion of the translator. When once switched to a particular operating curve it will remain in that state as long as desired, if the pulse train is continued. Further, the state of the memory cell consisting of the elements shown in Fig. 1 can be readily monitored across the terminals 18 and 19 of load 17. A plurality of these cells can be incorporated in a system employing a single pulse source 14 and combinations of common controls and/or output resistors can be made to combine other logic functions with those of memory. Thus, these cells can be combined in cascade and parallel arrangements with suitable interconnection to handle data.

Specific n-p-n-p diode structures whose effective alphas increase from a low value at low carrier denisties to a higher value at higher carrier densities and their modes of fabrication are disclosed in the aforementioned Shockley application. Those disclosures may be considered to be incorporated herein by reference. In particular, four zone, silicon, single crystal bodies can be fabricated from 0.5 ohm-centimeter p-type material having a lifetime for electrons of about 20 microseconds by antimony diffusion into slices about two mils thick followed by a boron diffusion. An appropriate combination of these steps results in a p-n-p-n structure since an oxide formed during the antimony diffusion procedure can be employed to mask the boron on one n-type face while boron can be diffused to a shorter depth and greater concentration in the opposite n-type face. Control of the boron concentration is attainable by virtue of its greater solubility in silicon than the solubility of antimony in silicon coupled with a diffusion procedure involving the use of lower temperatures and/or shorter times. In this example appropriate times and temperatures would be for antimony, 16 hours at 1300° C. to 1350° C., and for boron, one to two hours at 1200° C. to 1250° C.

The detailed procedure is as follows: the surfaces of a two mil thick wafer are prepared by mechanical polishing and etched in a mixture of 40 parts by volume of concentrated nitric acid and one part of concentrated hydrofluoric acid. The wafers are placed in a diffusion furnace of the type discussed in application Serial No. 550,622 of L. Derick and C. J. Frosch, now Patent 2,802,760, granted September 13, 1957, entitled "Oxidation of Semiconductive Surfaces for Controlled Diffusion" at a temperature of 1340° C. Nitrogen saturated with water vapor at a water temperature of 30° C. is passed over the samples at a rate of 1.5 liters per minute Antimony oxide ($Sb_2O_4$) is placed in a preheater through which the nitrogen passes and is maintained at 900° C. Diffusion is carried out for 16 hours, yielding an antimony layer 0.5 mil thick. The wafer is slowly cooled and an oxide film is removed from one face by rinsing it in hydrofluoric acid. The oxide-free surface is coated with a saturated solution of boron oxide ($B_2O_3$) in ethylene glycol monomethylether and the wafer is heated in air for two hours at 1200° C. followed by a slow cool. This results in a p-type layer on the coated side 0.2 to 0.3 mil thick while the presence of the oxide layer on the opposite side has prevented any change. It is to be understood that this example is presented as illustrative and is not to be interpreted as placing limits upon the form of devices according to this invention or the mode of their fabricaion. Suitable ohmic contacts are then applied to the n- and p-type outer regions as by alloying. The unit is then modified in accordance with this invention by the application of an additional ohmic contact to one of the intermediate regions in a known manner as by alloying aluminum through the n-type surface region to convert the material of that region which it engages to p conductivity type and to isolate that region from the contact by a p-n junction.

A device as described offers the change in alpha with current required for the present structure, presumably due to the presence of recombination centers which can be saturated. Additional centers can be introduced in the intermediate regions by the addition of iron or the formation of dislocations as by deforming the silicon or bombarding it with particles of high or intermediate energies (greater than a few hundred thousand electron volts).

It has been shown that the current multiplication $\alpha$ in a region of width W bounded by an emitter and a collector of charge carriers is $$\alpha = \operatorname{sech} \frac{W}{\sqrt{D\tau}}$$

where D is the diffusion constant of the minority carrier and $\tau$ is its lifetime. This equation illustrates the effect of an increase in lifetime $\tau$ in increasing $\alpha$ and thus the operation of the mechanism in region 32 discussed above. Further, it will be seen that by designing the translator so that the sech function is less for region 33 than region 32 control by region 32 is assured.

In a device of this form having from $10_{14}$ to $10_{15}$ recombination centers in region 32 the lifetime is about .01 microsecond and $\alpha$ about 0.1 microsecond for low currents while the high current, that sufficient to introduce a charge density $R_s$, lifetime becomes about 0.1 microsecond. As indicated above, the sum of the alphas of regions 32 and 33 approaches unity to provide a change in impedance of the form shown in Fig. 2.

The lifetime of the material in region 32 can be adjusted to the desired level by bombardment with particles of intermediate energy, about 500,000 electron volts, or by introducing iron or nickel in a germanium translator, into the region in a density of about $10_{14}$ to $10_{15}$ atoms per cubic centimeter. These treatments can be applied either before or after the diffusion process.

A memory cell employing a translator 11 of the type described above having a 10 microseconds lifetime in the low impedance condition can conveniently be operated with a pulse train having an on time of about 50 microseconds and an off time of about one microsecond. Translators of this type offer a sustaining voltage of about one volt and a breakdown voltage of from about 10 volts to 100 volts, depending upon the resistivities, lifetimes, and region thicknesses for the unit with the example breaking down at about 70 volts. Thus, a pulse-on magnitude of about 10 volts and a pulse-off of less than one volt are suitable for the cell. A triggering pulse of one volt or greater and of any presently attainable form and length applied across barrier 35 in the forward direction, will suffice to place the illustrative translator in its low impedance state while a reset pulse of one volt applied across barrier 35 in its reverse direction during the pulse-off interval for the train applied across terminals 12 and 13 is sufficient.

In a device operating according to the principles of this invention and fabricated as set forth above so that the minority carrier lifetime in the intermediate region is about 0.1 microsecond at the carrier densities occurring at the threshold of stable low impedance operation, a no-pulse interval of about 0.1 microsecond and a pulse interval of about 10 microseconds is appropriate. However, when the device is driven with greater currents, greater carrier densities occur and the lifetime increases to about one microsecond, hence greater no-pulse intervals, intervals of about one microsecond, can be employed. Generalizing, no-pulse intervals should be about the same as the minority carrier lifetime in the intermediate or controlled region and pulse intervals should exceed the transit time of minority carriers across the controlled region which is about 0.1 microsecond in the example.

Figure 7:
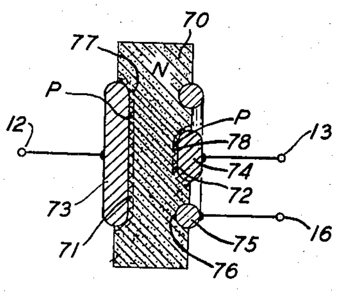
Fig. 7 is a sectioned elevation of another form of semiconductive translator having a characteristic of the form shown in Fig. 2.
Figure 8:
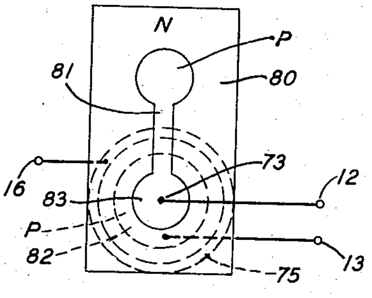
Fig. 8 is a plan view of an additional semiconductive translator which may be employed in data handling combinations of this invention.

While the preceding description has been directed in the main to a single form of semiconductive translator offering an initial high impedance stable state and capable of being triggered into a low impedance stable state, it is to be understood that a memory cell of the type shown in Fig. 1 might employ other forms of translators having these two impedance states. As examples of other semiconductive translators which can be modified to provide the controlled triggering and reset functions, structures derived from the above-identified applications of J. J. Ebers et al. and I. M. Ross, modified in accordance with this invention, are shown in Figs. 7 and 8, respectively. Each of these units can be fabricated and will function in accordance with the disclosures of those applications. They have each been modified by applying an essentially ohmic connection to the region between the emitting and collecting barriers as by alloying a gold member containing a small quantity of antimony, e. g., two percent, to the *n* conductivity type material in the known manner.

The unit of Fig. 7 comprises an n-type body 70 containing p-type emitter and collector regions 71 and 72 which may be formed, for example, by known alloying techniques employing metallic masses 73 and 74 which serve as connections for terminals 12 and 13. An ohmic connection is made to region 70 by a ring contact 75 which may be alloyed to the region at 76 and is connected to control terminal 16. In operation the application of a negative pulse to terminal 16 biases emitter 77, the n-p junction between 71 and 70 in its forward direction sufficiently to inject holes into region 70 in a density which causes a substantially greater IR drop in region 70 from the peripheral portions of the emitter than from its central portions. This drop reduces the proportion of the total carriers emitted which emanate from the emitter periphery, thereby increasing the proportion of the emitted carriers which are collected at junction 78 and the alpha of the device to reduce its impedance. As in the case of the four region device of Fig. 3 this translator can be reset by applying a reverse bias through terminals 12 and 16 to barrier 77 while the pulse train on the terminals 12 and 13 is at a no-pulse interval, thereby speeding up the decay of carrier density in region 70 to a faster rate than occurs during the intrinsic turn-off time of the unit by withdrawing carriers from that region.

A similar mechanism is employed in the translator of Fig. 8. In that unit the emission shifts from a uniform density over the barrier between the dumbbell shaped *p* conductivity type region 81 and the main n-type body portion 80 at low currents to the circular portion 83 of region 81 beneath connection 73 at high currents. This shift is due to the lateral IR drop within region 81 which reduces the forward bias on those portions of that region spaced from connection 73. Current multiplication at the barrier between p-type collector region 82 is enhanced by this shift, again due to the collection of an increased proportion of the emitted carriers. The control electrodes to region 80 can also be a ring 75 surrounding collector region 82 and making an ohmic connection with that region, as by alloying. Control terminal 16 is connected to connection 75 and functions to turn on the translator by increasing the forward bias on the junction under emitter region 81 or to reset by reverse biasing the junction between regions 81 and 80 so that it collects minority charge carriers from region 80 and accelerates the turn-off time.

It is to be understood that the above-described arrangements are illustrative of the application of the principles of the invention. Numerous other arrangements may be devised by those skilled in the art without departing from the spirit and scope of the invention.

What is claimed is:

1. A signal translating device comprising a semiconductive body including four zones arranged in succession, contiguous zones being of opposite conductivity type, first and second rectifying n-p junctions between the outer zones and the intermediate zones, a third n-p rectifying junction between said intermediate zones, a first electrical connection to the first end zone of said body, a second electrical connection to a second end zone of said body, a third electrical connection to a third zone intermediate said end zones in said body and contiguous with said first end zone, said third zone having a current multiplication factor which is a function of the charge carrier density therein and approaches unity at a critical charge carrier density whereby said impedance of said body between said first and second connections is high below the critical density and low above that critical density, a pair of output terminals, first circuit means connecting said first electrical connection to one of said pair of output terminals, second circuit means connecting said second electrical connection to the other of said pair of said output terminals, one of said circuit means including means for applying a pulse train, said pulse train having pulses of a polarity to bias the first junction between said first and third zone in the forward direction and of a magnitude which is insufficient to introduce the critical charge carrier density in said third zone and sufficient to maintain the critical charge carrier density in said third zone, said pulse train having a pulse-off interval which is insufficient to permit the charge carrier density in said third zone to decay below said critical level when it was above said critical level during the preceding pulse, means connected between said first and third connections for selectively altering the density of charge carriers in said third zone from one side of said critical density to the other, and a load circuit connected across said pair of output terminals.

2. A device in accordance with claim 1 wherein said means for selectively altering the charge carrier density in said third zone comprises means to apply a forward bias across said first p-n junction whereby said density is increased from below said critical value to above said critical value and means to apply a reverse bias across said first p-n junction whereby said density is decreased from above said critical value to below said critical value.

3. A device in accordance with claim 2 wherein said means to apply a reverse bias across said first p-n junction is operative during the pulse-off interval of said pulse train.

4. A signal translating device comprising a semiconductive body including four zones arranged in succession, contiguous zones being of opposite conductivity type, first and second rectifying n-p junctions between the outer zones and the intermediate zones, a third n-p rectifying junction between said intermediate zones, a first electrical connection to the first end zone of said body, a second electrical connection to a second end zone of said body, a third electrical connection to one of said intermediate zones in said body, said one intermediate zone having a current multiplication factor which is a function of the charge carrier density therein and approaches unity at a critical charge carrier density whereby said impedance of said body between said first and second connections is high below the critical density and low above that critical density, a pair of output terminals, first circuit means connecting said first electrical connection to one of said pair of output terminals, second circuit means connecting said second electrical connection to the other of said pair of output terminals, one of said circuit means including means for applying a pulse train, said pulse train having pulses of a polarity to bias the first junction between said first and said one intermediate zone in the forward direction and of a magnitude which is insufficient to introduce the critical charge carrier density in said one intermediate zone and sufficient to maintain the critical charge carrier density in said one intermediate zone and having a pulse interval longer than the transit time of the charge carrier across said one intermediate zone, said pulse train having a pulse-off interval which is insufficient to permit the charge carrier density in said one intermediate zone to decay below said critical level when it was above said critical level during the preceding pulse and having a pulse-off interval shorter than the transit time of a charge carrier across said one intermediate zone, means connected between said first and third connections for selectively altering the density of charge carriers in said third zone from one side of said critical density to the other, and a load circuit connected across said pair of output terminals.

5. A signal translating device comprising a semiconductive body having four zones arranged in succession, contiguous zones being of opposite conductivity type, a pair of electrical connections to the two end zones of the body, a pair of output terminals, first circuit means connecting one of said pair of connections to one of said pair of output terminals, second circuit means connecting the other of said pair of connections to the other of said pair of output terminals, a load circuit connected across said pair of output terminals, one of said circuit means including a pulse source, the two intermediate zones of said body normally floating at a potential determined by said pulse source, a connection to one of said intermediate zones, and switching control means including potential means connected between said connection to said one intermediate zone and the connection of said pair of connections which engages the end zone contiguous with said one intermediate zone.

6. A signal translating device comprising a semiconductive element having a critical reverse voltage at which a low impedance state is assumed and a critical sustaining current for which said low impedance state is maintained comprising a semiconductive body having a p-n-p-n array of zones, a pair of electrical connections to the two end zones of said array, two intermediate zones normally assuming a floating potential between the end zones, control means including potential means for applying between one of said end zones and one of said intermediate zones forward or reverse voltages which are momentarily sufficient to change the density of the charge carrier in said one intermediate zone sufficiently to transfer the impedance of said body between said high and low values, means imposing a train of pulses across said body connected to said pair of connections, said pulses having a magnitude less than said critical reverse voltage and when said body is in the low impedance state causing a current in excess of said critical sustaining current to flow through said body.

References Cited in the file of this patent

UNITED STATES PATENTS

| | | |
|---|---|---|
| 2,665,610 | Ebers | Oct. 13, 1953 |
| 2,728,857 | Sziklai | Dec. 27, 1955 |
| 2,795,762 | Sziklai | June 11, 1957 |
| 2,805,397 | Ross | Sept. 3, 1957 |